US007882690B2

United States Patent
Nehring et al.

(10) Patent No.: US 7,882,690 B2
(45) Date of Patent: Feb. 8, 2011

(54) TRANSVERSE LIMB AND MEMBER OF A LINE GUIDE DEVICE WITH A TRANSVERSE LIMB

(75) Inventors: Harald Nehring, Bonn (DE); Andreas Hermey, Hennef (DE); Gunter Blase, Bergisch Gladbach (DE); Frank Blase, Bergisch Gladbach (DE)

(73) Assignee: Igus GmbH, Cologne (DE)

( * ) Notice: Subject to any disclaimer, the term of this patent is extended or adjusted under 35 U.S.C. 154(b) by 290 days.

(21) Appl. No.: 12/104,419

(22) Filed: Apr. 16, 2008

(65) Prior Publication Data
US 2008/0251630 A1 Oct. 16, 2008

(30) Foreign Application Priority Data
Apr. 16, 2007 (DE) .................. 20 2007 005 566 U

(51) Int. Cl.
*F16G 13/16* (2006.01)
(52) U.S. Cl. .............................. 59/78.1; 59/900; 248/49
(58) Field of Classification Search ...................... 59/78, 59/78.1, 900; 248/49, 51
See application file for complete search history.

(56) References Cited

U.S. PATENT DOCUMENTS

| 4,590,961 | A | * | 5/1986 | Schumann | ..................... 248/49 |
| 4,833,876 | A | * | 5/1989 | Kitao et al. | ................... 59/78.1 |
| 4,885,908 | A | * | 12/1989 | Stohr | ........................... 59/900 |
| 6,029,437 | A | * | 2/2000 | Hart | .............................. 59/78 |
| 6,789,383 | B1 | * | 9/2004 | Plush et al. | .................... 59/78.1 |
| 7,249,452 | B2 | * | 7/2007 | Komiya | ........................ 248/51 |
| 7,290,384 | B2 | * | 11/2007 | Weber et al. | .................. 59/78.1 |
| 7,526,910 | B2 | * | 5/2009 | Komiya | ....................... 59/78.1 |
| 2002/0056336 | A1 | | 5/2002 | Blase | |

(Continued)

FOREIGN PATENT DOCUMENTS

DE 3714056 8/1988

(Continued)

OTHER PUBLICATIONS

German Search Report dated Aug. 27, 2007 issued in related German Patent Application No. 102007005566.

(Continued)

*Primary Examiner*—David B Jones
(74) *Attorney, Agent, or Firm*—Grossman Tucker Perreault & Pfleger, PLLC

(57) ABSTRACT

A transverse limb (5, 6) for connecting two side portions (3, 4) of a member of a line guide device, wherein the transverse limb (5, 6) is lockable at least at one of its ends (9) to the side portion (5, 6) to be connected there. For improved locking of the transverse limb to the side portion it is proposed that it has an actuating portion (7) and a locking portion (8) which is displaceable by way of the actuating portion (7) substantially in the longitudinal direction of the transverse limb (5, 6) towards the end (9) with which the transverse limb (5, 6) can be connected to the side portion (3, 4), into a locking position in which the transverse limb (5, 6) is lockable to the side portion (3, 4), and is displaceable away from said end (9) into an unlocking position in which the transverse limb (5, 6) is releasable from the side portion (3, 4).

17 Claims, 7 Drawing Sheets

U.S. PATENT DOCUMENTS

2007/0071544 A1    3/2007    Komiya

FOREIGN PATENT DOCUMENTS

| DE | 19948926 | 6/2000 |
| DE | 19919076 | 11/2000 |
| DE | 102006039336 | 4/2007 |
| DE | 202007005566 | 9/2007 |
| JP | 03079838 | 4/1991 |

OTHER PUBLICATIONS

International Search Report dated Aug. 6, 2008 issued in related International Patent Application No. PCT/DE2008/000602.

* cited by examiner

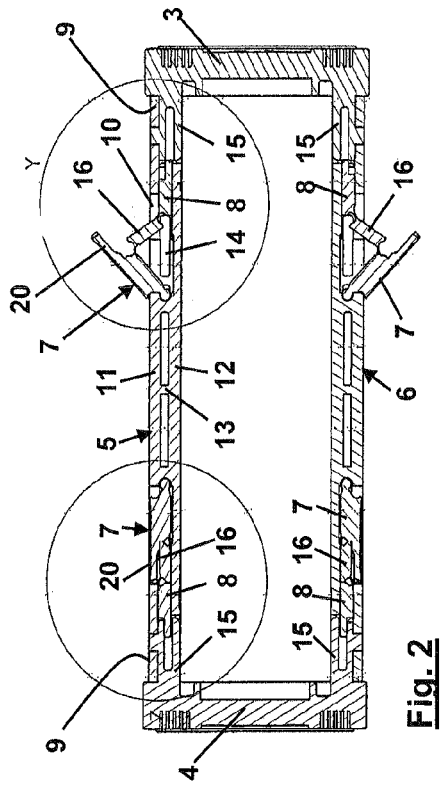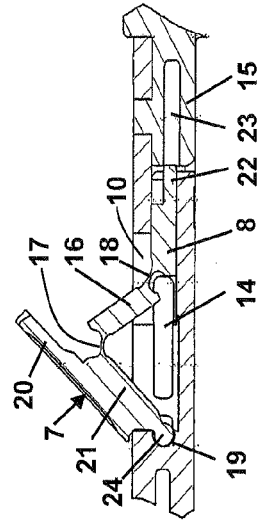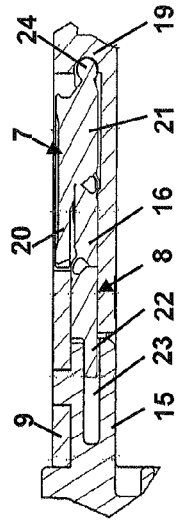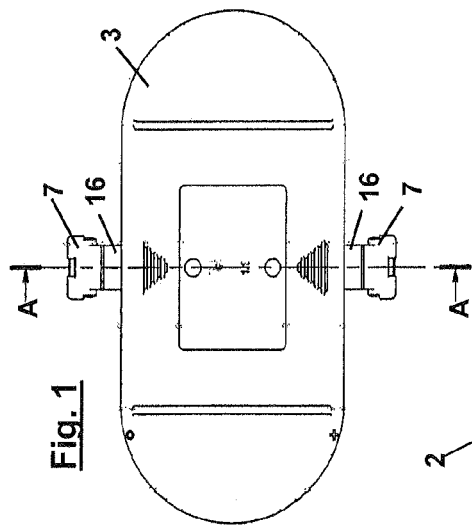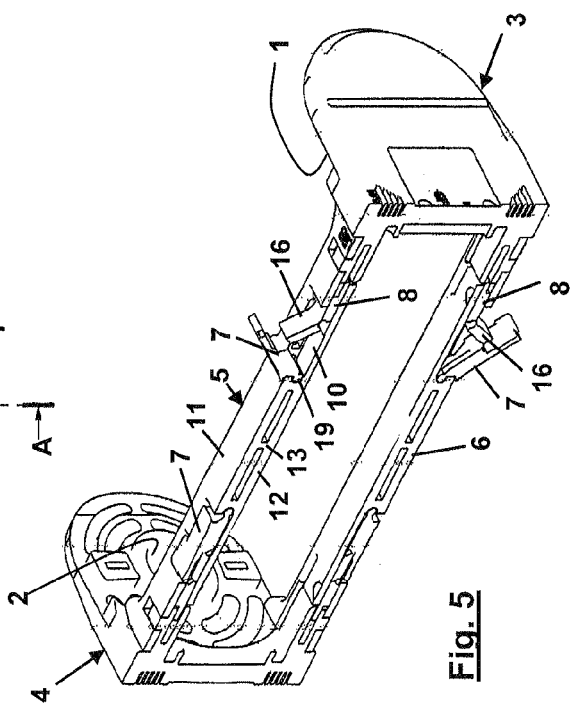

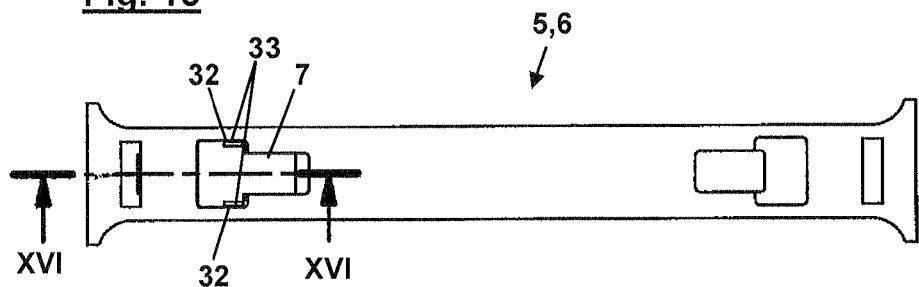
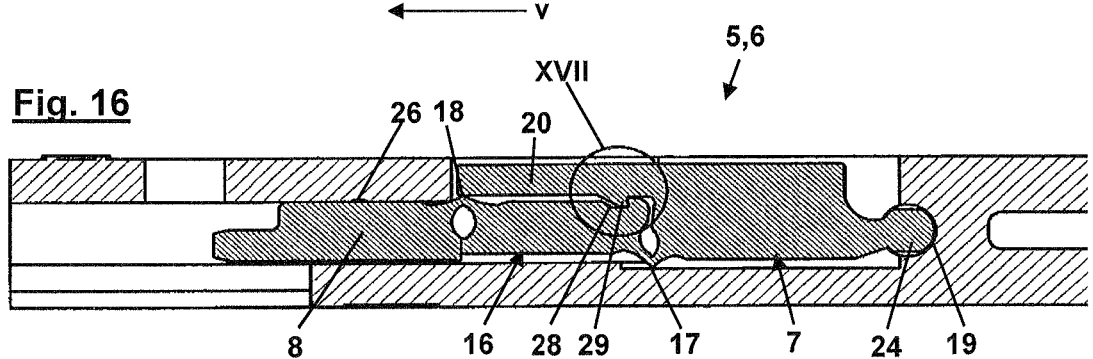
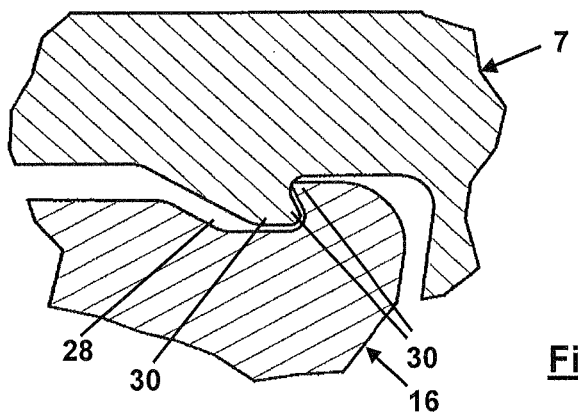

TRANSVERSE LIMB AND MEMBER OF A LINE GUIDE DEVICE WITH A TRANSVERSE LIMB

The invention concerns a transverse limb for connecting two side portions of a member of a line guide device, wherein the transverse limb is lockable at least at one of its ends to the side portion to be connected there. The invention further concerns a member of a line guide device which can be composed of a plurality of mutually pivotable members, wherein the member has two mutually opposite side portions and a transverse limb connecting them, which is lockable at least at one of its ends to the side portion to be connected there.

Transverse limbs for members of a line guide device, which can be releasably fixed to the side portions by latching engagement are known from the state of the art. When higher stresses and greater line weights are involved it is desirable for the transverse limbs to be fixedly connected to the side portions so that the stability of the member is increased. Non-releasable connections, for example by screwing of the transverse limbs to the side portions, are known for that purpose. It is further known for the transverse limbs to be locked to the side portions by inserting a lock bar into the side portions from the exterior, in which case the transverse limbs are releasable from the side portions again by removing the lock bars.

However, to open the chain link members, that is to say for the purposes of removing the lock bars to withdraw the transverse limbs, a line guide device arranged in a guide channel has to be taken out of the guide channel in order to gain lateral access to the lock bars and to pull them out in an outward direction. The lock bars are also components which can be lost and which have to be picked up separately after the transverse limbs are unlocked.

The object of the present invention is to provide a transverse limb of the kind set forth in the opening part of this specification and a member of a line guide device having such a transverse limb, wherein the transverse limb is lockable in a stable fashion to the side portion to be connected and no parts which can be lost are required for the locking operation.

According to the invention that object is attained in that, in a transverse limb of the kind set forth in the opening part of this specification, there are provided an actuating portion and a locking portion on or in the transverse limb, wherein the locking portion is displaceable by way of the actuating portion substantially in the longitudinal direction of the transverse limb towards the end with which the transverse limb can be connected to the side portion, into a locking position in which the transverse limb is lockable to the side portion, and is displaceable away from said end into an unlocking position in which the transverse limb is releasable from the side portion.

By virtue of the structure according to the invention the actuating portion and the locking portion co-operating therewith on or in the transverse limb is accessible from the exterior without any problem, without any need for manipulation of the line guide device, for example lifting it out of a guide channel. In addition the actuating portion and the locking portion in or on the transverse limb can be arranged in such a way that they cannot be lost as the transverse limb has sufficient space available both for the locking position of the actuating portion and the locking portion and also for the unlocking position of the actuating portion and the locking portion. The actuating portion and the locking portion co-operating therewith do not have to be particularly picked up as parts which can be lost, in the unlocking position.

In a preferred development of the invention the locking portion is guided in or on the transverse limb in the longitudinal direction thereof.

Preferably the locking portion has a projection facing towards the end of the transverse limb, with which it is to be connected to the side portion. The projection is of such a configuration that it engages into a groove disposed at the inwardly facing side of the side portion in the longitudinal direction of the transverse limb and thereby affords the locking action. The projection can be of a plate-shaped configuration, for example in the form of a flat parallelepiped.

The actuating portion and/or the locking portion can be arranged in such a way that they can be fixed in the locking position and/or in the unlocking position of the locking portion. Their positional fixing makes it possible to effectively counteract the risk that the actuating portion and/or the locking portion are accidentally released from the locking position and thus can at least reduce the strength of the connection between the transverse limb and the side plates. In addition by virtue of that arrangement the actuating portion and the lever portion can project beyond the limb and thus adversely affect easy displacement of the line device. In the event of unintentional release from the unlocking position, assembly of the transverse limb can be more difficult.

In an advantageous development of the invention the locking portion is connected by way of an elbow lever to the actuating portion. The actuating portion is supported pivotably in or on the transverse limb but not displaceably towards the opposite end.

If both opposite ends of the transverse limb are to be lockable to the oppositely disposed side portions of a member, two individual actuating portions which respectively co-operate with a locking portion at the ends of the transverse limb or also one actuating portion which co-operates with both locking portions can be used.

In a further advantageous configuration of the transverse limb according to the invention the actuating portion in the locking position of the locking portion is pivotable into an opening in the transverse limb and in the unlocking position of the locking portion it is pivotable out of the opening.

Preferably the opening is arranged at the side of the transverse limb, which after its connection to the side portions of the member of a line guide device faces outwardly.

Desirably in the locking position of the locking portion, the actuating portion at its end which is pivotable out of the opening is arranged at a spacing relative to the oppositely disposed edge of the opening, which permits the engagement of a tool for lifting the end of the actuating portion which is pivotable out of same.

At its end which is pivotable out of the opening or at its surface which is exposed in the opening, the actuating portion can also have a groove which permits the engagement of a tool for lifting the end of the actuating portion, which is pivotable out of same.

Preferably the actuating portion is latchable in the locking position of the locking portion in or on the transverse limb so that it cannot be unintentionally moved out of the locking position or the locking position released by vibration of the member of the line guide device.

In order to have a surface which is as smooth as possible in the region of the opening it is desirable if in the locking position of the locking portion the actuating portion is arranged with its surface facing out of the opening in aligned relationship with the surrounding surface of the transverse limb.

In a preferred development of the invention the actuating portion, for pivotable arrangement on or in the transverse limb, is provided with a hinge portion which is supported rotatably in or on the transverse limb. The hinge portion can include two oppositely disposed hinge pins which engage into the hinge mounting in or on the transverse limb.

Desirably the hinge mounting is provided in or on the transverse limb in such a way that the hinge portion, for example the hinge pins, can be latched in or on the transverse limb, in the specified example in the mounting receiving means.

The elbow lever can have a lever portion which at its first end is connected by way of a first hinge to the actuating portion and at its second end opposite to the first end to the locking portion by way of a second hinge.

The hinges are preferably in the form of film hinges. Accordingly the actuating portion, the lever portion and the locking portion can be produced in one piece, for example by injection molding, in the form of a plastic material component.

In an advantageous development the actuating portion, the lever portion and the locking portion have abutments which limit the pivotal movement of the lever portion with respect to the actuating portion and the locking portion into the respective substantially straight position.

In a further preferred configuration the actuating portion at its end opposite to the pivotable mounting in or on the transverse limb has a tongue portion which extends over the lever portion. The tongue portion increases the lever length of the actuating portion of the elbow lever so that locking can be implemented by means of a relatively low level of manual force.

Advantageously the tongue portion projects at a region of greater material thickness of the actuating portion.

The elbow lever can then be designed as follows. The first hinge connects the edge, facing away from the tongue portion, of the region of greater material thickness of the actuating portion and the edge, also facing away from the tongue portion, of the lever portion, while the second film hinge connects the oppositely disposed edges, which are towards the tongue portion, of the lever portion and the locking portion.

In that design configuration the part, that adjoins the tongue portion, of the region of greater thickness and the edge region of the lever portion, that faces towards the tongue portion, form the abutments for limiting the pivotal movement of the actuating portion relative to the lever portion into the substantially straight position. The two oppositely disposed edge regions, which extend away from the tongue portion, of the lever portion and the locking portion form the abutments for limiting the pivotal movement of the lever portion relative to the locking portion into the substantially straight position.

The material thickness of the actuating portion, which is greater in relation to the tongue portion, can approximately correspond to the thickness of the lever portion so that, in the straight position, the actuating portion and the lever portion have a region of approximately equal thickness. Upon movement of the elbow lever into the straight position the tongue portion and the lever portion lie one upon the other and can thus be arranged in a space of equal depth in the transverse limb.

In another configuration, for locking a transverse limb at its two opposite ends, it is also possible to use an actuating portion which co-operates with both locking portions. For that purpose the single actuating portion can comprise two actuating parts which are connected together by a hinge and which are arranged at an angle relative to each other in the unlocking position of the two locking portions. In order to move the locking portions into their locking position the two actuating parts which are connected together for example by a film hinge can be pushed into the straight position.

A single actuating portion which connects the two locking portions in the form of a bridge can be advantageous in particular in the case of short transverse limbs.

Preferably the actuating portion and/or the locking portion are latchable at a side wall of the opening. For that purpose the actuating portion and/or locking portion can each have a respective laterally projecting first projection which in the locking position and/or in the unlocking position of the locking portion respectively latches into an opening provided in the side wall. Preferably the projection and the opening extend, in relation to the side wall of the opening, transversely with respect to the movement of the locking portion between the unlocking position and the locking position.

In a preferred configuration of the transverse limb the first projection serves as an abutment for positional fixing of the locking portion which is guided in the opening, in the unlocking position. For that purpose the first latching projection can bear in the unlocking position at the inside against the opening, through which the actuating portion can be pivoted from the unlocking position into the locking position of the locking portion.

In a further configuration of the transverse limb the actuating portion can be fixed, preferably latched in the locking position with the locking portion and/or with the lever portion. In that way it can be held in the intended unlocking position, which facilitates fitting the limb to a member.

For that purpose it is possible to provide two hook elements which engage latchingly into each other. By way of example the actuating portion can have a second projection which in the locking position engages latchingly into a latching opening preferably provided on the lever portion. Because of the mounting of the actuating portion and the lever portion, pivotably relative to each other, the second latching projection can extend in a hook shape with a component towards the mounting of the actuating portion 7. Similarly the latching opening can have an undercut configuration behind which the second projection latchingly engages in the locking position of the locking portion.

Thus the second projection can come into snapping engagement in the latching opening and/or can come into hooking engagement therewith. That can take place with slight elastic deformation of the second projection and the undercut configuration. Pivotal movement of the actuating portion out of the locking position of the locking portion can also take place against a deformation resistance, with preferably elastic or at least substantially elastic deformation. The deformation resistance thus forms the resistance to that pivotal movement. In order to initiate the deformation specifically at the end of the second projection the second projection can be of a narrowing configuration towards its free end.

The second projection and the associated latching aperture can also extend transversely with respect to the longitudinal direction of the transverse limb.

Particularly if the actuating portion, in the locking position of the locking portion, is arranged in aligned relationship with the surrounding surface of the limb, it can be found difficult to release the actuating portion from the locking position. That can be intensified by the actuating portion or the locking portion being fixable, in particular latchable, in the locking position of the locking portion, as described in greater detail hereinafter. It can therefore be provided that at its end which pivots out at the opening, the actuating portion defines with the edge of the opening a lateral aperture for the tool to pass therethrough.

For example in the case of the above-indicated configuration of the actuating portion in the form of an elbow lever with a lever portion, to prevent the tool engaging under the lever portion when it passes through the aperture, it can be provided that the lever portion at a side which is towards the aperture in the locking position of the locking portion has a receiving means for supporting the tool which engages through the aperture. That receiving means can be in the form of a groove in which the tool is supported. Preferably the aperture is of a slot-like configuration and can thus be matched to a conventional screwdriver. It can be provided that the aperture is closable for example by way of a film-like closure or a closure connected to the transverse limb by way of a film hinge, in particular a flap, to prevent particles from entering through the aperture.

In an alternative configuration the actuating portion can be in the form of a slider which is guided in or on the transverse limb in the longitudinal direction thereof and can be in particular rigidly connected to the locking portion.

For that purpose the transverse limb can have a window which is arranged over the actuating portion and through which the actuating portion and thus the locking portion are displaceable manually or with a tool into the locking position of the locking portion and out of same into the unlocking position.

Preferably the actuating portion has a latching tongue which faces away from the locking portion and which can be engaged with a snapping action into the window in the locking position of the locking portion.

Preferably the actuating portion has an abutment which, by bearing against an abutment surface in or on the transverse limb, limits the displacement of the actuating portion out of the locking position into the unlocking position.

In a preferred configuration of the foregoing alternative the actuating portion has a groove which permits the engagement of a tool for producing the displacement.

The foregoing object is further attained by a member of a line guide device which can be composed of a plurality of mutually pivotable members, wherein the member has two mutually opposite side portions and a transverse limb connecting them, as is described hereinbefore.

In particular the side portion which is to be connected to the transverse limb by locking has a protrusion which is inwardly directed, that is to say towards the opposite side portion and the end to be connected of the transverse limb has an opening which is inwardly open, that is to say towards the interior of the member and into which the protrusion engages, wherein the end of the protrusion which faces towards the opposite side portion has an opening into which the locking portion engages.

The end of the transverse limb, that is to be connected to the side portion in question, can be placed on the protrusion in such a way that the latter engages into the opening and the end of the transverse limb, that is to be locked, is positioned precisely at the inside of the side portion. The locking portion can then be pushed into the opening in the protrusion into its locking position by way of the actuating portion.

Other variants are also possible, wherein the end of the transverse limb, that is to be locked, can be introduced into and positioned in an opening in the side portion in question so that arranged at the end part of the end of the transverse limb, which end engages into the opening, is a material region of the side portion, into which the locking portion can engage. The opening in the side portion is desirably opened inwardly, that is to say towards the interior of the member, so that the transverse limb can engage there and is also open perpendicularly to the longitudinal direction of the side portion so that the transverse limb can be fitted into the opening in the opposite direction. Then, provided at the inwardly directed side wall of the side portion, which side wall is in opposite relationship to the end part of the end of the transverse limb, that is to be locked, is an opening into which the locking portion can engage.

In a preferred configuration the transverse limb is in the form of a plate-shaped limb with smaller and larger respectively opposite side surfaces and the inwardly projecting protrusion is also of a plate-shaped configuration, wherein the end opening in the protrusion is substantially in the form of a flat parallelepiped.

Furthermore, at its larger outwardly facing side the protrusion can have a nose, wherein the transverse limb is provided in the region of the opening with an orifice for receiving the nose.

The positively locking connection produced by the protrusion with the nose formed thereon and the opening as well as the orifice in the transverse limb permits particularly stable fixing of the transverse limb to be locked, to the side portion.

Two embodiments by way of example of the present invention are described in greater detail hereinafter with reference to the drawing in which:

FIG. 1 shows a side view of a member,

FIG. 2 shows a cross-section along line A-A in FIG. 1,

FIG. 3 shows a view on an enlarged scale of the region Y in FIG. 2,

FIG. 4 shows a view on an enlarged scale of the region Z in FIG. 2,

Figure 6:
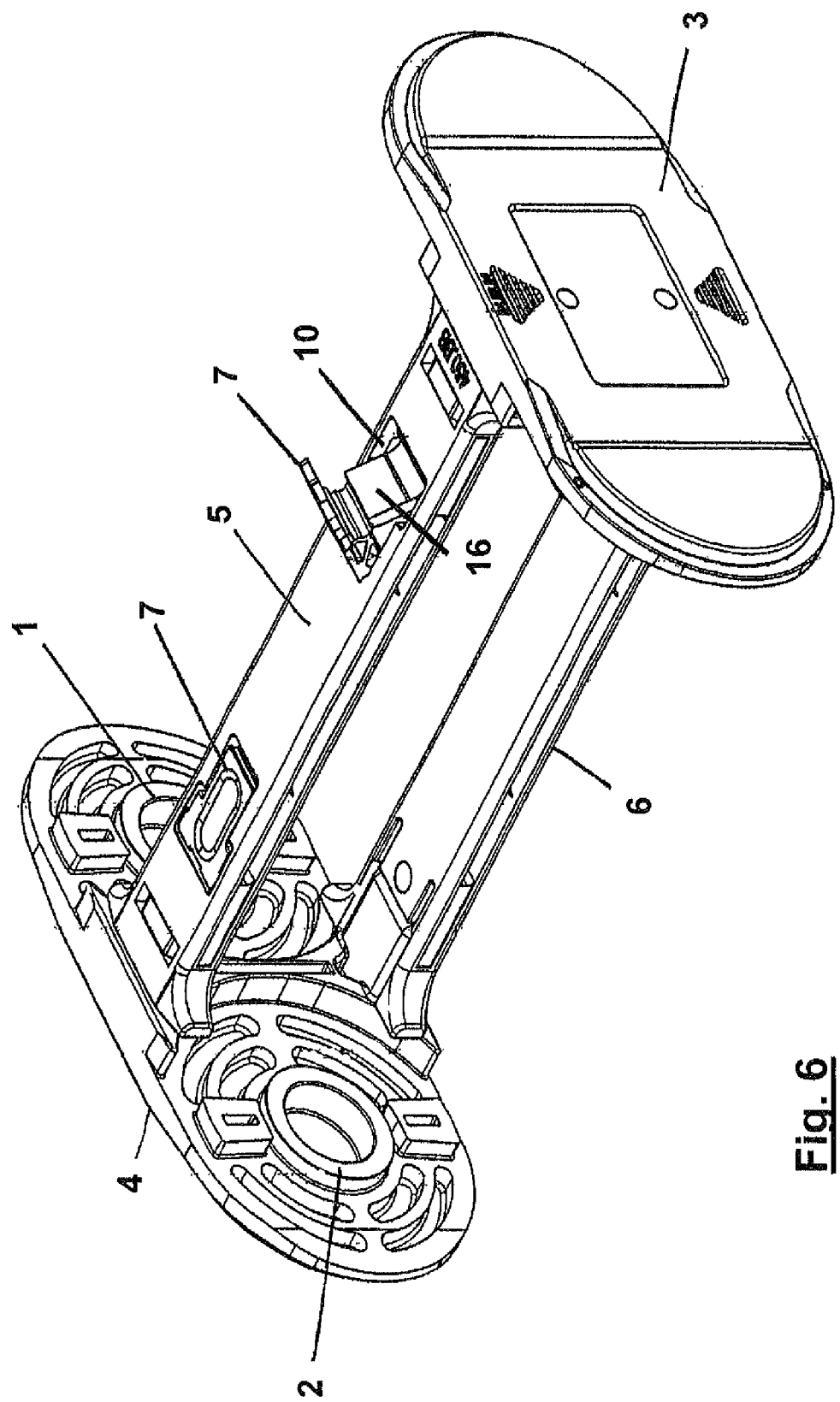
Figure 7:
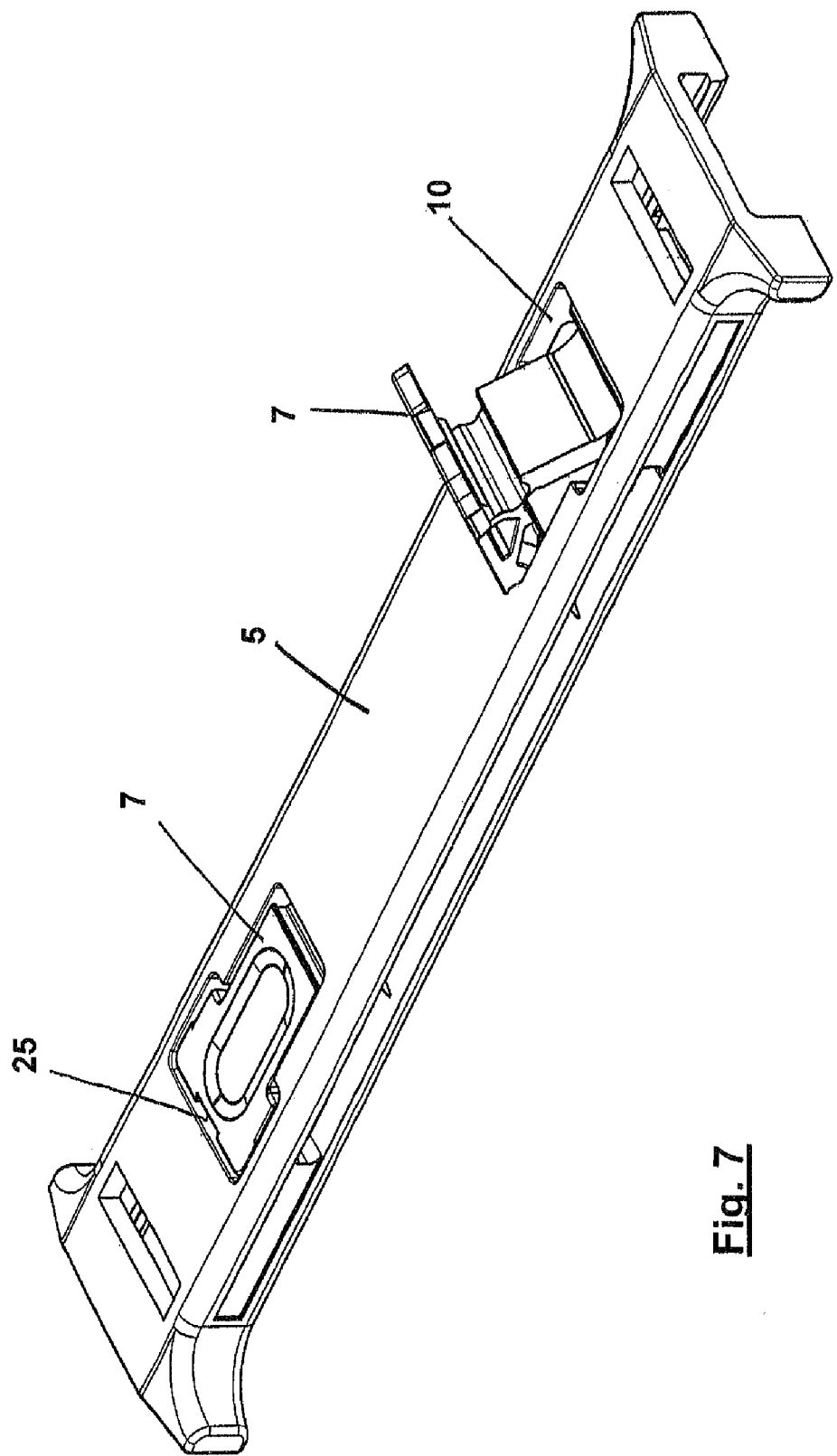
Figure 10:
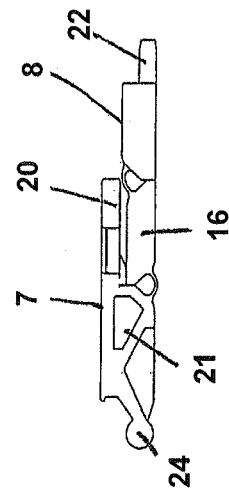
Figure 11:
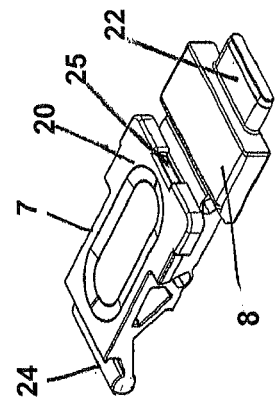
Figure 8:
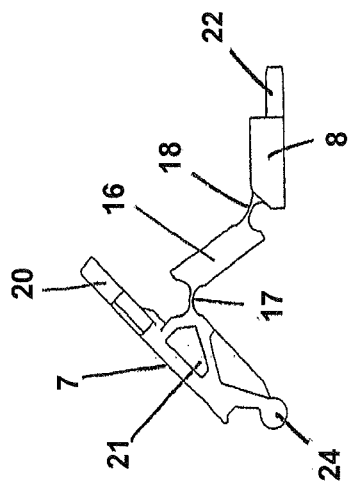
Figure 9:
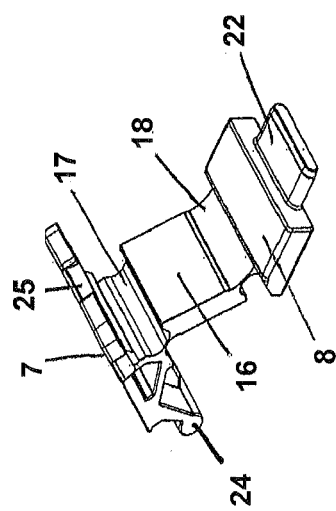
Figure 12:
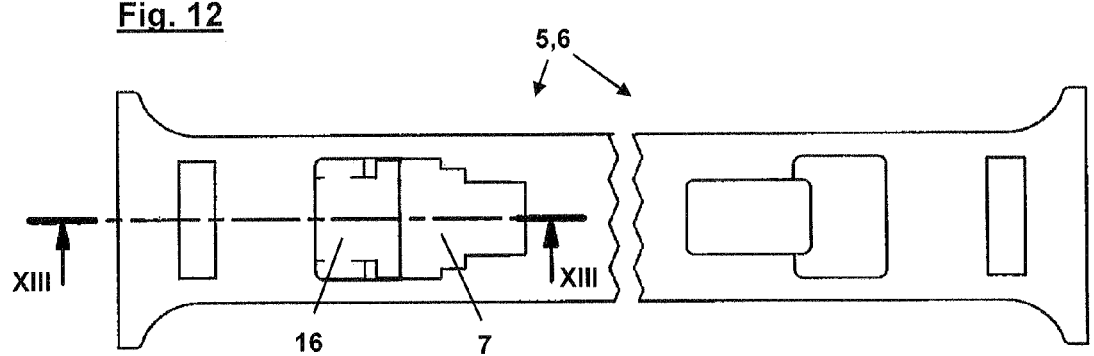
Figure 13A:
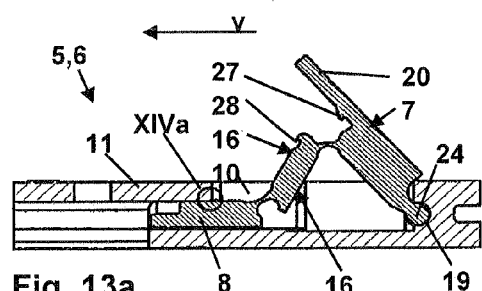
Figure 13B:
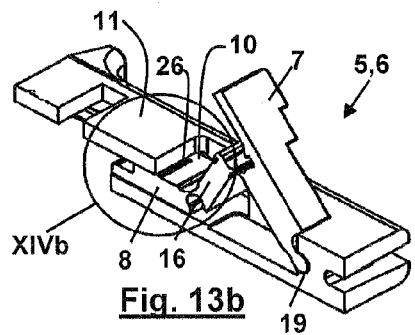
Figure 14A:
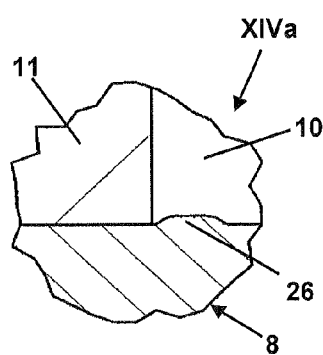
Figure 14B:
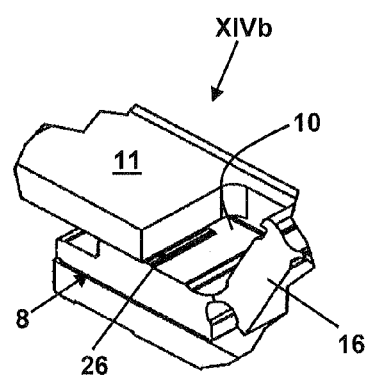
Figure 18:
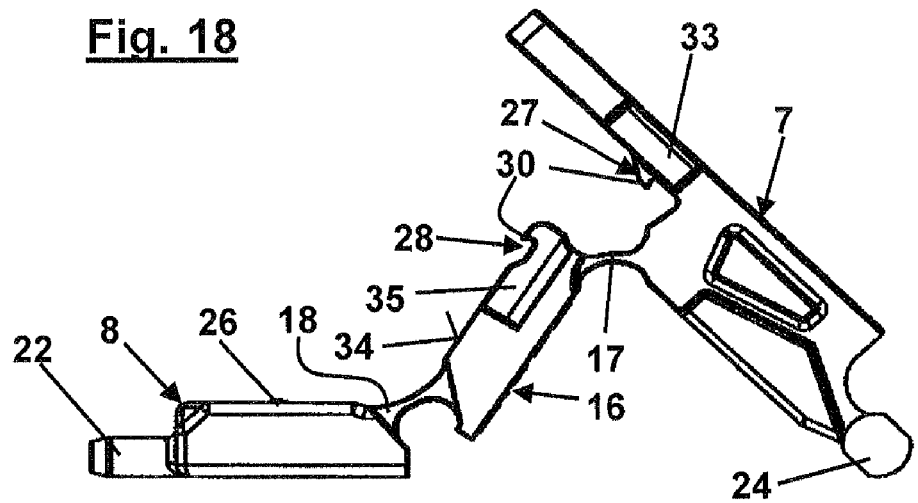
Figure 19:
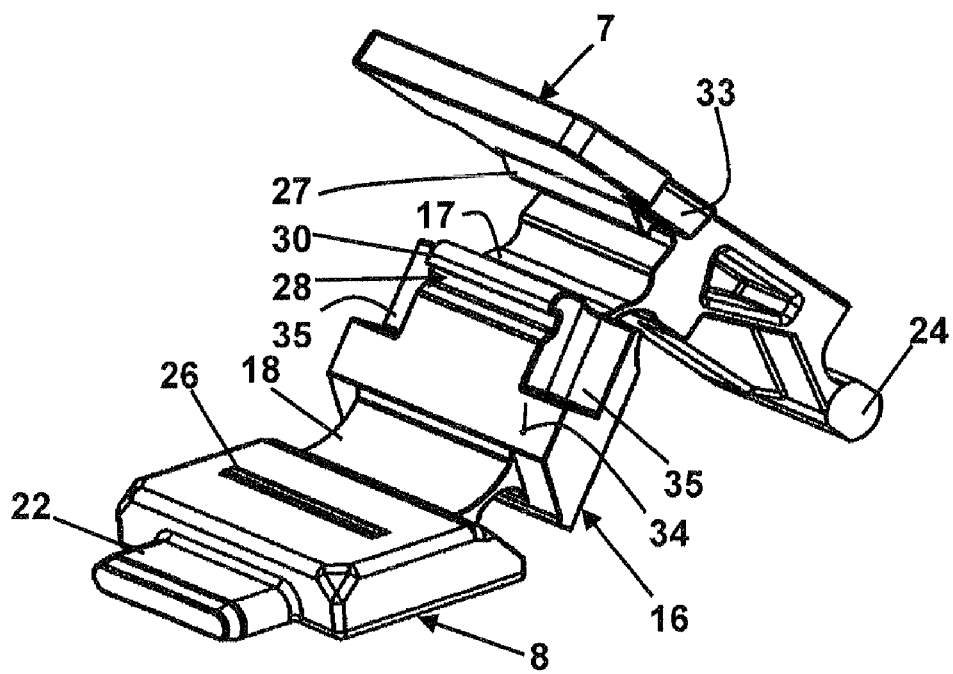

FIG. 5 shows a perspective view of the member of FIG. 1, which is half cut open, FIG. 6 shows a perspective view of the entire member, FIG. 7 shows a view on an enlarged scale of the transverse limb shown in FIG. 6, FIG. 8 shows a side view of the locking device in the unlocking position, FIG. 9 shows a perspective view of the locking device in the unlocking position, FIG. 10 shows a side view of the locking device in the locking position, FIG. 11 shows a perspective view of the locking device in the locking position, FIG. 12 shows a perspective view of the limb in a further embodiment with the locking device in the unlocking position, FIG. 13a shows a view in longitudinal section along line XIII-XIII in FIG. 12, FIG. 13b shows a perspective view in longitudinal section along line XIII-XIII in FIG. 12, FIG. 14a shows a portion XIV as shown in FIG. 13a, FIG. 14b shows a portion XV as shown in FIG. 13b, FIG. 15 shows a plan view of the limb of FIG. 12 with the locking device in the locking position, FIG. 16 shows a view in longitudinal section of the limb along line XVI-XVI in FIG. 15, FIG. 17 shows a portion XVII as shown in FIG. 16, FIG. 18 shows a side view of an embodiment of the locking device in the unlocking position as shown in FIG. 15, and FIG. 19 shows a perspective view of the locking device as shown in FIG. 18.

FIGS. 1, 2, 5 and 6 show a member of a line guide device, wherein a plurality of such link members are hingedly connected together and form the line guide device. The embodiment shown in the Figures is a line guide device which is in the form of an energy guide chain and the link members of which have link member regions 1 and 2 for hinged connection to adjacent members.

Each link member of the energy guide chain comprises two side portions 3 and 4 and an upper limb 5 and a lower limb 6 which connect the side portions 3 and 4. As will be described in greater detail hereinafter the transverse limbs 5 and 6 are each connected to the side portions 3 and 4 by a locking device. As described hereinafter the transverse limbs 5, 6 shown in FIGS. 2 through 11 differ from the transverse limbs 5, 6 shown in FIGS. 12 through 17, in regard to the differing configuration of the locking device.

As is shown in detail in particular in FIGS. 3 and 4 as well as FIGS. 8 and 11 the locking device includes an actuating portion 7 and a locking portion 8 which is displaceable by way of the actuating portion 7 substantially in the longitudinal direction of the transverse limb 5 or 6 respectively in question towards the end 9 thereof, into a locking position. The transverse limb 5 or 6 respectively is locked to the side portion 3 or 4 respectively in the locking position of the locking portion. It is also displaceable away from its end 9 into an unlocking position in which the transverse limb 5 or 6 is releasable from the side portion 3 or 4 respectively.

As shown in particular in FIGS. 8 through 11 the locking portion 8 is connected to the actuating portion 7 by way of an elbow lever structure, wherein the actuating portion 7 is mounted pivotably in the transverse limb 5 or 6 respectively, as can be seen in particular from FIGS. 3 and 4.

In the locking position shown in FIG. 4 as well as 10 and 11 the actuating portion 7 is pivoted into an opening 10 in the transverse limb 5 or 6 respectively while it is pivoted out of the opening 10 in the unlocking position shown in FIG. 3 as well as 8 and 9.

As can be seen in particular from FIGS. 2 and 5 the transverse limbs 5 and 6 comprise two elongate parallel plates 11 and 12 connected together by transversely extending limbs 13. At their ends the transverse limbs 5 and 6 are provided with openings 14 which are open at the end and inwardly, that is to say towards the interior of the member, and into which engage protrusions 15 which are directed towards the respectively opposite side portion, on the side portions 3 and 4 in question.

The openings 14 which receive the protrusions 15 are continued between the plates 11 and 12 from the protrusions 15 over a given region in the longitudinal direction of the transverse limbs 5 and 6, in the direction of the center of the transverse limbs 5 and 6. As can be seen in particular from FIGS. 3 and 4, that region receives the locking portion 8 and guides it in the transverse limb between lateral boundary walls.

As can be seen more precisely from FIGS. 3 and 4 and FIGS. 8 through 11 the locking device which is in the form of an elbow lever has a plate-shaped lever portion 16 which is connected at a first end to the actuating portion 7 by way of a first hinge 17 and at its second end in opposite relationship to the first end to the locking portion 8 by way of a second hinge 18. The hinges 17 and 18 are in the form of film hinges.

As can further be seen from the above-specified Figures the actuating portion 7, at its end opposite to the pivotable mounting 19, has a tongue portion 20 which extends over the lever portion 16. The tongue portion projects at a region 21 of greater material thickness of the actuating portion 7. The first hinge 17 connects the oppositely disposed edge regions of the region 21 of greater material thickness and of the lever portion 16, which edge regions face away from the tongue portion 20 of the actuating portion 7, while the second hinge 18 connects the oppositely disposed edge regions of the lever portion 16 and the locking portion 8, which edge regions face towards the tongue portion.

As can be seen from FIGS. 3 and 4 and FIGS. 8 through 11, the material thickness of the actuating portion 7, which is larger in relation to the tongue portion 20, approximately corresponds to the thickness of the material 16 so that the actuating portion 7 and the lever portion 16 have a region of approximately equal thickness in the straight position. When the elbow lever is moved into the straight position the tongue portion 20 and the lever portion 16 thus bear against each other and can be received by the opening 10 in the transverse limb 5 or 6 respectively. The actuating portion 7 and the tongue portion 20 formed thereon form an aligned flat top side which, in the locking position shown in FIG. 4 and FIGS. 10 and 11, covers over the opening 10 in aligned relationship with the top side of the transverse limb 5 or 6, surrounding the opening 10.

The thickness of the lever portion 16 also corresponds to the thickness of the locking portion 8 so that both portions can be guided in the prolongation of the end opening 14 in the transverse limb 5 or 6 respectively.

As can further be seen from FIGS. 3 and 4 and FIGS. 8 through 11 the locking portion 8, at its end facing away from the actuating portion 7, has a projection 22 which engages into a corresponding end opening 23 of the inwardly facing protrusion 15 of the side portion 3 or 4 respectively and locks the transverse limb 5 or 6 respectively to the respective side portion 3, 4.

The locking device comprising the actuating portion 7, the lever portion 16 and the locking portion 8 is produced in the form of a one-piece injection molding in an arrangement as can be seen from FIG. 3 and FIGS. 8 and 9.

The locking device is fitted with the locking portion 8 into the opening 10 in the transverse limb 5 or 6 respectively. For the purposes of guidance of the locking portion 8 between the inner side walls of the transverse limb 5 or 6 respectively, it is of a plate-shaped configuration, of a suitable width. The protrusion 22 formed on the locking portion 8 at the end is adapted to the end opening 23 in the protrusion 15 of the side portion 3, 4 in question.

In addition the actuating portion is fitted into the mounting 19, as shown in FIG. 3, for pivotal arrangement in the transverse limb 5 or 6 respectively, with a hinge portion 24. The mounting 19 which is in the form of a semicircular groove delimits the prolongation of the opening 14 away from the end 9 of the transverse limb 5 or 6 respectively so that it forms a support means for the elbow lever of the locking device.

In the position of being fitted into the opening 10 and the opening 14, the actuating portion 7 and the lever portion 16 form an angle to each other, which makes it possible for the locking portion 8 to be displaced in the direction of the end 9 of the transverse limb 5 or 6 respectively, by pressure applied to the outside of the tongue portion 20. The orifice of the opening 10 outwardly thus extends in a direction towards the end 9 of the transverse limb 5 or 6 respectively to such an extent that, upon displacement of the locking portion 8, the lever portion 16 can move into the opening 10 by the angle between it and the actuating portion 7 being increased by pressure applied to the tongue portion 20 and finally amounting to 180°. The top side of the actuating portion 7 and the tongue portion 20 is arranged in aligned relationship with the top side of the transverse limb 5 or 6 respectively, that surrounds the opening 10, in the straight 180° position.

The hinge portion 24 of the actuating portion 7 includes two oppositely disposed hinge pins which engage into the mounting 19 in the transverse limb 5 or 6 respectively. The mounting 19 is also of such a design that the hinge pins are latchable in the mounting 19.

As shown in particular in FIG. 11, at its end which is pivotable out of the opening 10 and which faces away from the hinge portion 24, the actuating portion 7 has a groove 25 which permits the engagement of a tool, for example a small screwdriver, for lifting the end of the tongue portion 20 which can be pivoted out of the opening.

FIGS. 12 through 17 show a further embodiment of the transverse limb 5, 6. It differs from the embodiment of the transverse limb 5, 6 shown in FIGS. 2 through 11, in particular in regard to the design configuration of the locking device. Here the actuating portion 7 and the locking portion 8 can be fixed in position in the locking position and in the unlocking position of the locking portion 8. The actuating portion 7 and the locking portion 8 are shown in the unlocking position in FIGS. 12 through 14, except for the locking portion 8 and the actuating portion 7 as shown at the right in FIG. 12. The actuating portion 7 and the locking portion 8 are shown in the locking position in FIGS. 15 through 17.

In particular the locking portion 8 has a laterally projecting first projection 26 for fixing the position thereof in the unlocking position. The projection 26 bears in the unlocking position in a locking direction v from the unlocking position into the locking position against the opening 10 of the transverse limb 5, 6 at the inside thereof, by which the actuating portion 7 is pivotable. To move the locking portion from the unlocking position into the locking position, it is firstly necessary to overcome a resistance which is formed by the first projection 26 having to be displaced into the opening 14 with elastic deformation of the first projection 26 and/or the opening 14. The first projection 26 extends perpendicularly to the longitudinal extent of the transverse limb 6, 7 or perpendicularly to the locking direction v and bears laterally against the opening 10 over the entire length of the projection. Furthermore the first projection 26 is formed integrally on the locking portion 8, that is to say here it is injection molded thereon.

In this embodiment of the transverse limb 6, 7, positional fixing of the locking portion 8 in the locking position is based on a different mechanism which is shown in FIGS. 15 through 17: the actuating portion 7 and the lever portion 16 are latchable together in the locking position of the locking portion 8. As can be seen in particular from FIGS. 15 and 16 the actuating portion 7, at its tongue portion 20 with which it overlaps the lever portion 16 in the locking position, has a second projection 27. In the locking position the second projection 27 engages into a latching opening 28 on the lever portion 16.

The second projection 27 is of a hook-shaped configuration with a shaped component towards the mounting 19. The latching opening 28 includes an undercut configuration 29, behind which the second projection 27 engages in the locking position of the locking portion 8. Thus, the second projection 27 and the latching opening 28 are in hooking engagement into each other in the locking position. In that respect the second projection 27 and the latching opening 28 with the undercut configuration 29 respectively form hooks. To release that latching or hooking engagement the second projection 27 and the latching opening 28, that is to say in particular the free end 30 of the projection 27 and the undercut configuration 29, have to be elastically deformed against a deformation resistance, that is to say enlarged. The hook-shaped projection 27 narrows towards its free end 30. Likewise the wall thickness of the undercut configuration 29 is narrowed towards its free end 30.

The first projection 26 is arranged guided in the locking direction v into the opening 14 in the locking position of the locking portion 8 and bears thereagainst at the inside with elastic enlargement of the opening 14. That further increases the force which has to be applied for moving the locking portion 8 out of the locking position towards the unlocking position and thus positional fixing of the locking portion 8 in the locking position of the locking portion 8.

As can be clearly seen from FIG. 16 the hinges 17, 18 in the locking position respectively bear against the limb 5, 6 and are thereby stabilized in position. In particular the first hinge 17 bears at the inside against the plate 12 and the second hinge 18 bears against the tongue portion.

FIGS. 18 and 19 show a side view and a perspective plan view of the locking device with actuating portion 7, locking portion 8 and lever portion 16, as an individual view. As shown for example in FIG. 18 the actuating portion, in the locking position of the locking portion 8, is arranged in aligned relationship with the surface of the transverse limb 5, 6. To unlock the locking portion 8, it is provided that the actuating portion 7 at its pivotable end 31 is pivoted out of the opening 10, by means of a tool which is not shown here, that is to say here it is levered out of the opening 10. As can further be seen from FIG. 15 the actuating portion 7 is arranged in two opposite regions at its pivotable end 31 in part spaced with respect to the edge 32 of the opening 10 in such a way that it delimits therewith an aperture 33 for the tool to engage therethrough. The aperture 33 is here of a slot-like configuration and is thus suitable for the engagement therethrough for example of a conventional screwdriver.

As shown in particular in FIGS. 18 and 19 a receiving means 35 for support for the tool which engages through the aperture 33 is provided on the lever portion 16 at a side 34 which faces towards the aperture 33 in the locking position of the locking portion 8. That is intended to prevent the tool being supported with its engagement through the aperture 33 at a possibly inappropriate location or even engaging under the lever portion 16 with damaging consequences. In this case the receiving means 35 is of a groove-shaped configuration, in which case the tool can be supported at the bottom of the groove and is guided in the receiving means 35 during the levering-up operation.

LIST OF REFERENCES 1 hinge region
2 hinge region
3 side portion
4 side portion
5 upper transverse limb
6 lower transverse limb
7 actuating portion
8 locking portion
9 end
10 opening
11 plate
12 plate
13 limb
14 opening
15 protrusion
16 lever portion
17 first hinge
18 second hinge
19 mounting
20 tongue portion
21 region
22 projection
23 opening
24 hinge portion
25 groove
26 first projection
27 second projection 28 latching opening
29 undercut configuration
30 free end
31 end
32 edge
33 opening
34 side
35 receiving means
v locking direction

The invention claimed is:

1. A transverse limb for connecting two side portions of a member of a line guide device, wherein the transverse limb includes ends and at least at one of said ends is lockable to one of said two side portions wherein the transverse limb has an actuating portion and a locking portion which is displaceable by way of the actuating portion substantially in a longitudinal direction of the transverse limb towards said at least one of said ends with which the transverse limb is connected to the side portion and into a locking position and said locking portion is displaceable away from said at least one of said ends into an unlocking position in which the transverse limb is released from said one of said two side portions.

2. A transverse limb as set forth in claim 1 wherein the locking portion is guided in or on the transverse limb in the longitudinal direction thereof.

3. A transverse limb as set forth in claim 1 wherein the locking portion has a projection facing towards at least one of said ends of the transverse limb.

4. A transverse limb as set forth in claim 1 wherein the actuating portion and/or the locking portion can be fixed in position in the locking position and/or in the unlocking position.

5. A transverse limb as set forth in claim wherein the locking portion is connected by way of a lever portion to the actuating portion and is supported pivotably in a mounting arrangement in or on the transverse limb.

6. A transverse limb as set forth in claim 5 wherein the actuating portion in the locking position of is pivotable into an opening in the transverse limb and in the unlocking position is pivotable out of the opening.

7. A transverse limb as set forth in claim 6 wherein in the locking position, the actuating portion is arranged at a spacing relative to an oppositely disposed edge of the opening, which permits the engagement of a tool for lifting an end of said actuating portion which is pivotable out of the opening.

8. A transverse limb as set forth in claim 6 wherein in the locking position the actuating portion is arranged with a surface facing out of the opening in aligned relationship with a surrounding surface of the transverse limb.

9. A transverse limb as set forth in claim 5 wherein the lever portion at a first end is connected by way of a first hinge to the actuating portion and at a second end opposite to the first end to the locking portion by way of a second hinge.

10. A transverse limb as set forth in claim 5 wherein the actuating portion at an end opposite to the pivotable mounting arrangement has a tongue portion which extends over the lever portion.

11. A transverse limb as set forth in claim 6 wherein the locking portion for positional fixing thereof in the unlocking position has a laterally projecting first projection which in the unlocking position bears at the inside against said opening.

12. A transverse limb as set forth in claim 9 wherein the actuating portion is latchable in the locking position with the locking portion or with the lever portion.

13. A transverse limb as set forth in claim 12 wherein the actuating portion has a second projection which in the locking position engages latchingly into a latching opening provided on the lever portion.

14. A transverse limb as set forth in claim 7 wherein said end of the actuating portion defines with an edge of the opening a lateral aperture for the tool to pass therethrough and that the lever portion at a side which is towards the aperture in the locking position has a receiving means for supporting the tool which engages through the aperture.

15. A transverse limb as set forth in claim 1 wherein the actuating portion is in the form of a slider which is guided in or on the transverse limb in the longitudinal direction thereof and is rigidly connected to the locking portion.

16. A member of a line guide device which comprises one of a plurality of mutually pivotable members, wherein the member has two mutually opposite side portions and a transverse limb connecting them wherein the transverse limb includes ends and at least at one of said ends is lockable to one of said two side portions wherein the transverse limb has an actuating portion and a locking portion which is displaceable by way of the actuating portion substantially in a longitudinal direction of the transverse limb towards said at least one of said ends with which the transverse limb is connected to the side portion and into a locking position and said locking portion is displaceable away from said at least one of said ends into an unlocking position in which the transverse limb is released from said one of said two side portions.

17. A member as set forth in claim 16 wherein one of said two mutually opposite side portions which is to be connected to the transverse limb by locking has an inwardly directed protrusion and said at least one of said ends of the transverse limb has an inwardly facing opening into which the protrusion engages, wherein an end of the protrusion which faces towards the other of said two mutually opposite side portions has an opening into which the locking portion engages.

* * * * *

UNITED STATES PATENT AND TRADEMARK OFFICE
CERTIFICATE OF CORRECTION

| | | |
|---|---|---|
| PATENT NO. | : 7,882,690 B2 | |
| APPLICATION NO. | : 12/104419 | |
| DATED | : February 8, 2011 | |
| INVENTOR(S) | : Nehring et al. | |

It is certified that error appears in the above-identified patent and that said Letters Patent is hereby corrected as shown below:

In column 11, line 33, in claim 5, after "claim" insert -- 1 --.

In column 11, line 38, in claim 6, after "position" delete "of".

Signed and Sealed this
Tenth Day of May, 2011

David J. Kappos
*Director of the United States Patent and Trademark Office*